Figure 1:
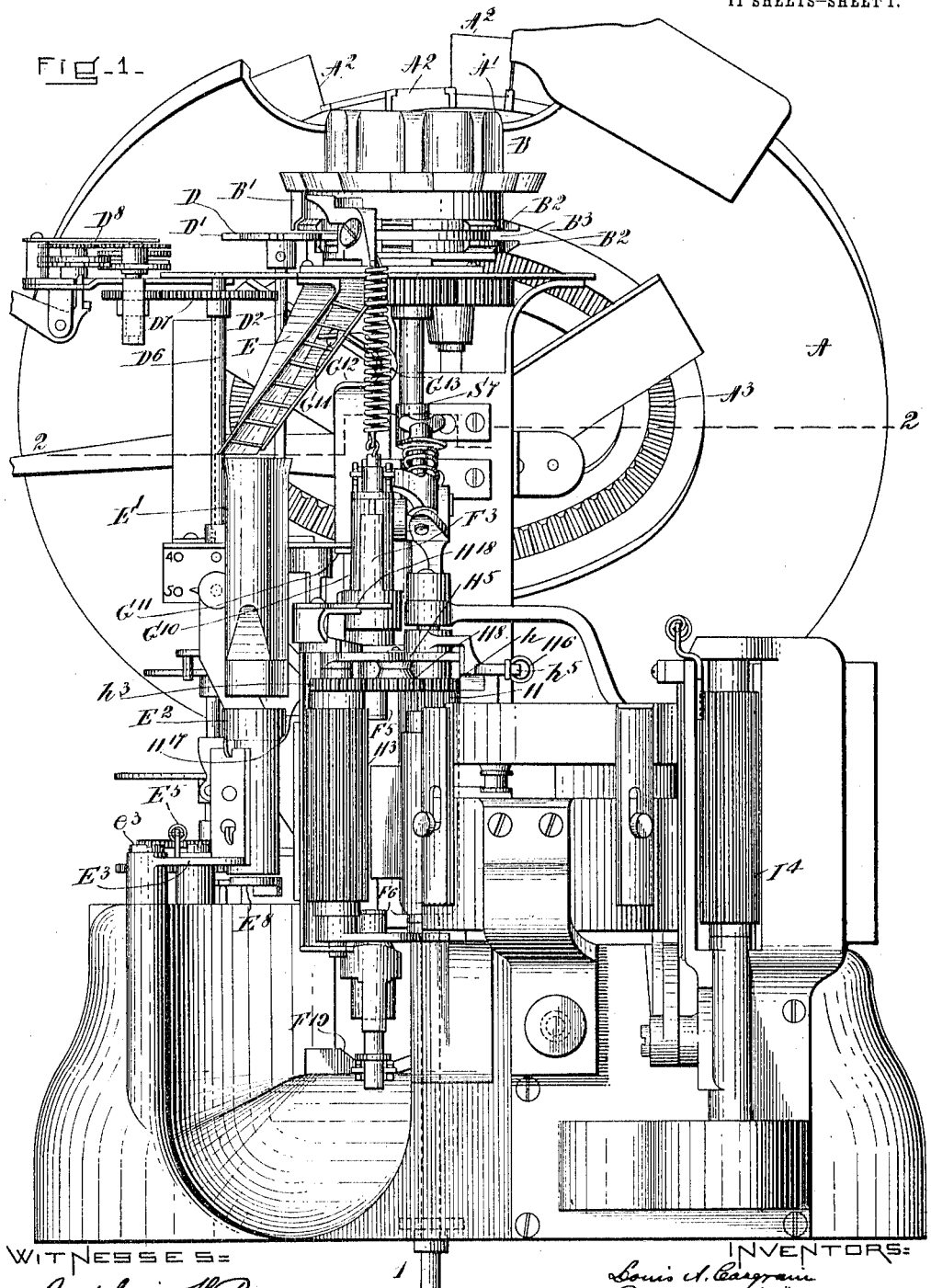

L. A. CASGRAIN & R. L. WHITMAN.
COIN HANDLING MACHINE.
APPLICATION FILED JUNE 18, 1913.

1,118,472.

Patented Nov. 24, 1914.
11 SHEETS—SHEET 1.

L. A. CASGRAIN & R. L. WHITMAN.
COIN HANDLING MACHINE.
APPLICATION FILED JUNE 18, 1913.

1,118,472.

Patented Nov. 24, 1914.
11 SHEETS—SHEET 2.

L. A. CASGRAIN & R. L. WHITMAN.
COIN HANDLING MACHINE.
APPLICATION FILED JUNE 18, 1913.

1,118,472.

Patented Nov. 24, 1914.
11 SHEETS—SHEET 8.

L. A. CASGRAIN & R. L. WHITMAN.
COIN HANDLING MACHINE.
APPLICATION FILED JUNE 18, 1913.

1,118,472.

Patented Nov. 24, 1914.
11 SHEETS—SHEET 9.

WITNESSES:

INVENTORS:

L. A. CASGRAIN & R. L. WHITMAN.
COIN HANDLING MACHINE.
APPLICATION FILED JUNE 18, 1913.
1,118,472.
Patented Nov. 24, 1914.
11 SHEETS—SHEET 10.
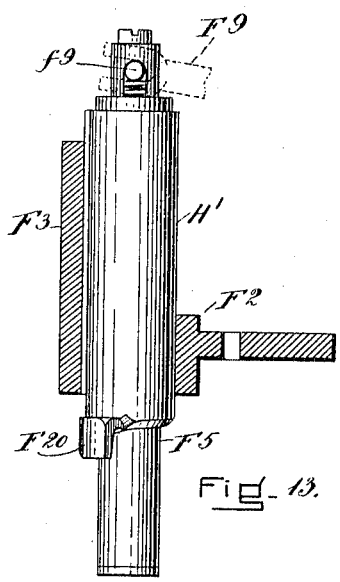
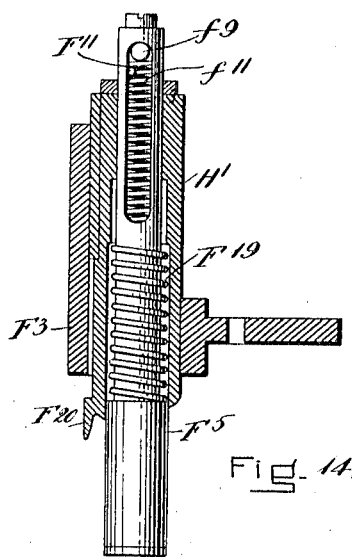
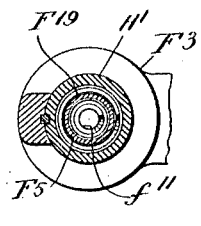
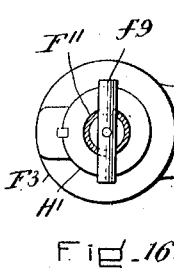
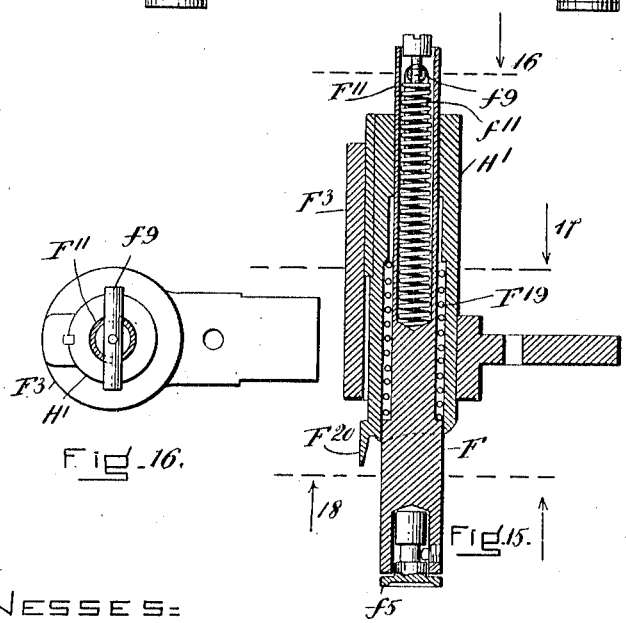
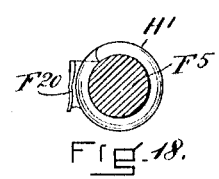

L. A. CASGRAIN & R. L. WHITMAN.
COIN HANDLING MACHINE.
APPLICATION FILED JUNE 18, 1913.

1,118,472.

Patented Nov. 24, 1914.
11 SHEETS—SHEET 11.

UNITED STATES PATENT OFFICE.

LOUIS A. CASGRAIN, OF BEVERLY, AND RAYMOND L. WHITMAN, OF HAMILTON, MASSACHUSETTS, ASSIGNORS TO AUTOMATIC APPLIANCE COMPANY, OF BOSTON, MASSACHUSETTS, A CORPORATION OF MASSACHUSETTS.

COIN-HANDLING MACHINE.

1,118,472. Specification of Letters Patent. Patented Nov. 24, 1914.

Original application filed January 3, 1913, Serial No. 739,933. Divided and this application filed June 18, 1913. Serial No. 774,338.

*To all whom it may concern:*

Be it known that we, LOUIS A. CASGRAIN and RAYMOND L. WHITMAN, citizens of the United States, and residents of Beverly and Hamilton, respectively, in the county of Essex and State of Massachusetts, have invented new and useful Improvements in Coin-Handling Machines, of which the following is a specification.

Our invention relates to machines for counting, stacking and wrapping coins, and comprises improvements in the counting, stacking and packing mechanism by means of which coins are first arranged in stacks each containing a predetermined number of coins, and the coin stacks are then wrapped in a cartridge of paper or other suitable sheet material drawn from a supply roll, the cartridge crimped and secured at its ends and thereafter released from the machine to be delivered to any suitable receptacle.

The present application is a division of our application Serial No. 739,933, filed January 3, 1913.

The machine in which our improvements are embodied preferably comprises also mechanism for automatically selecting, from a miscellaneous mass of coins, coins of a single selected denomination, and comprises also means for delivering the selected coins to the transferring and counting mechanism from which they pass to be operated on by the other characteristic departments of the machine.

The coin selecting mechanism in itself forms no part of our present invention, and we have shown in the drawings hereto annexed a coin selecting mechanism which is substantially the same as that shown and described in Lilleberg's United States Patent No. 915,100, dated March 16, 1909.

Our inventions are exemplified and embodied in a machine which is illustrated in the accompanying drawings, in which,—

Figure 2:
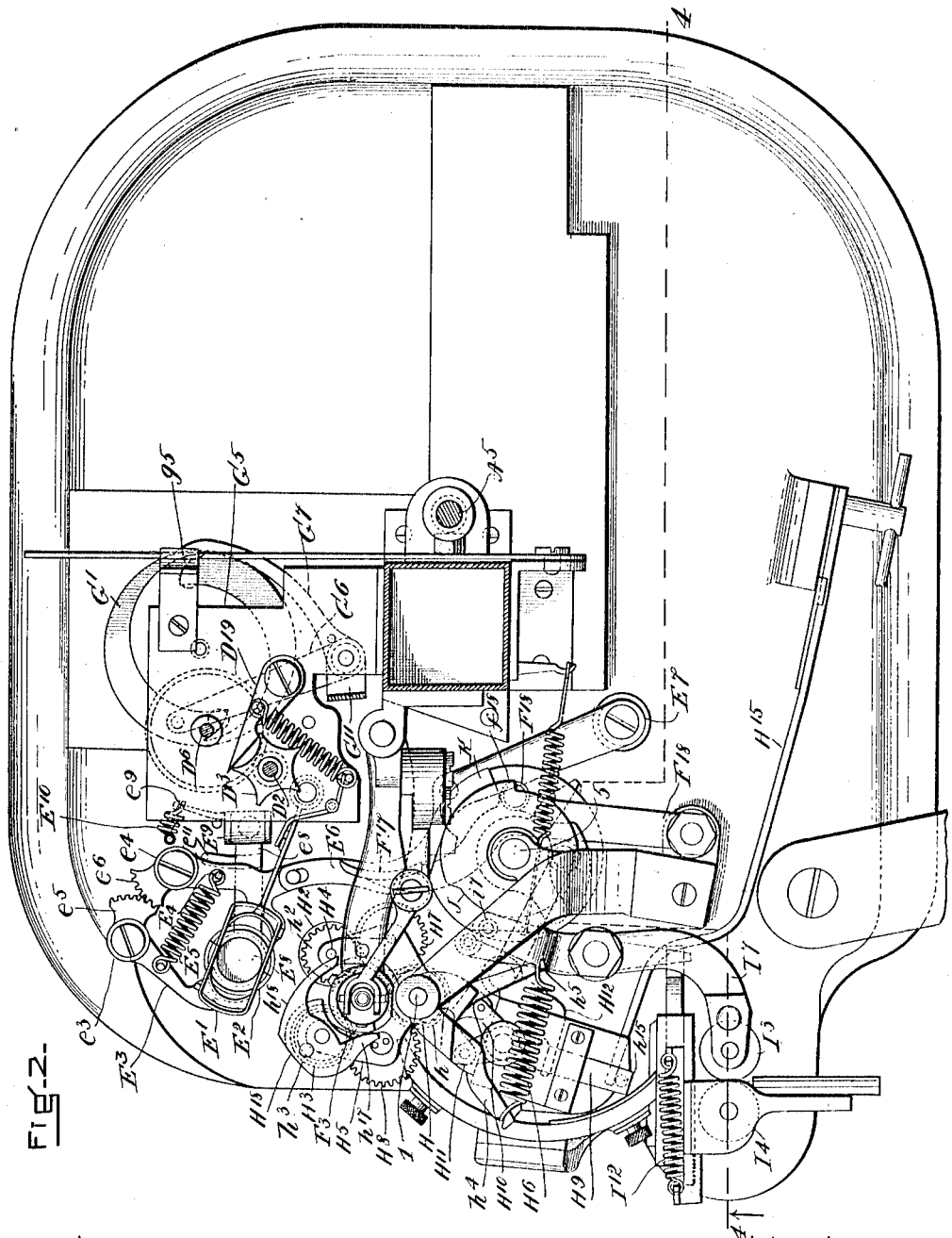
Figure 3:
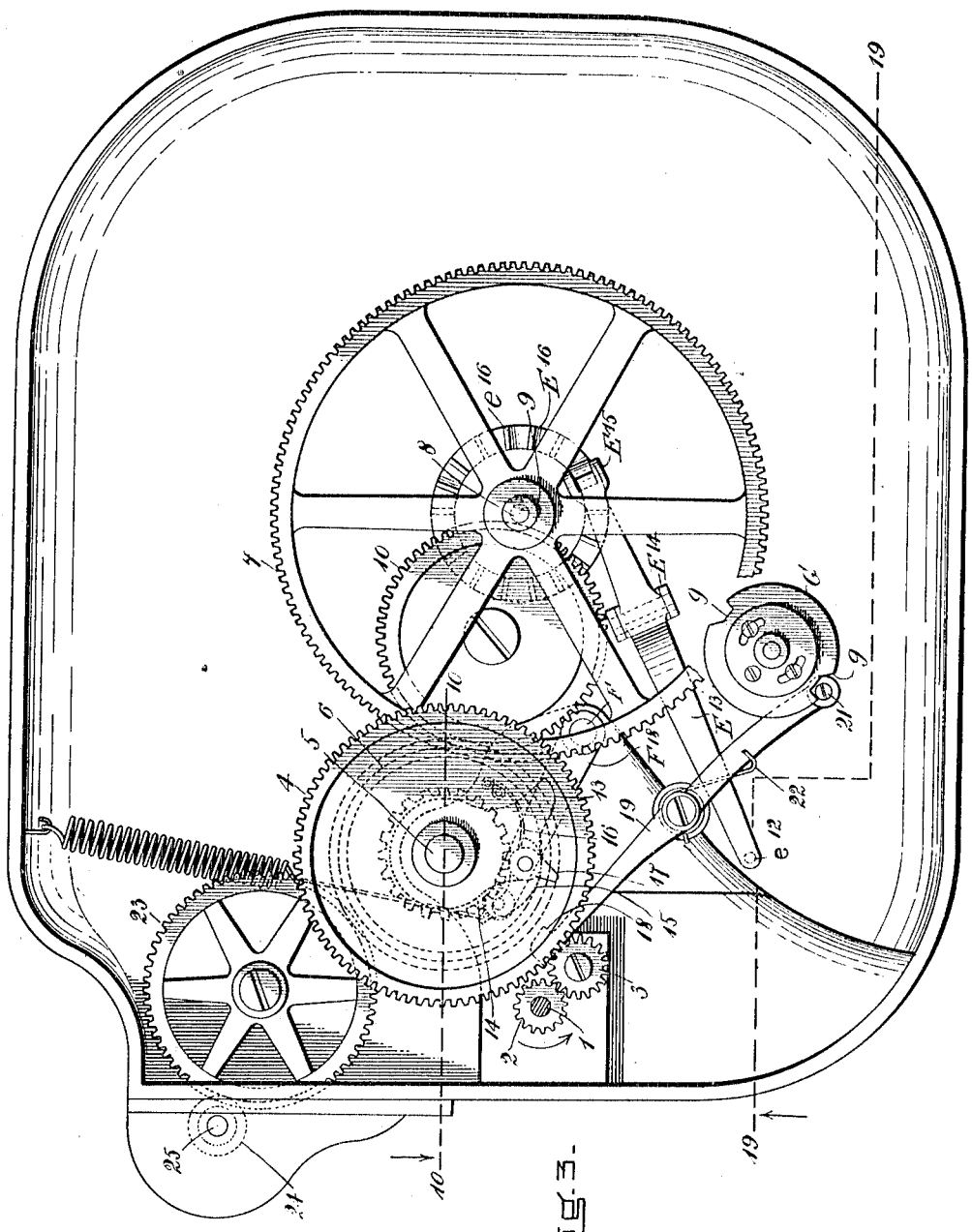
Figure 4:
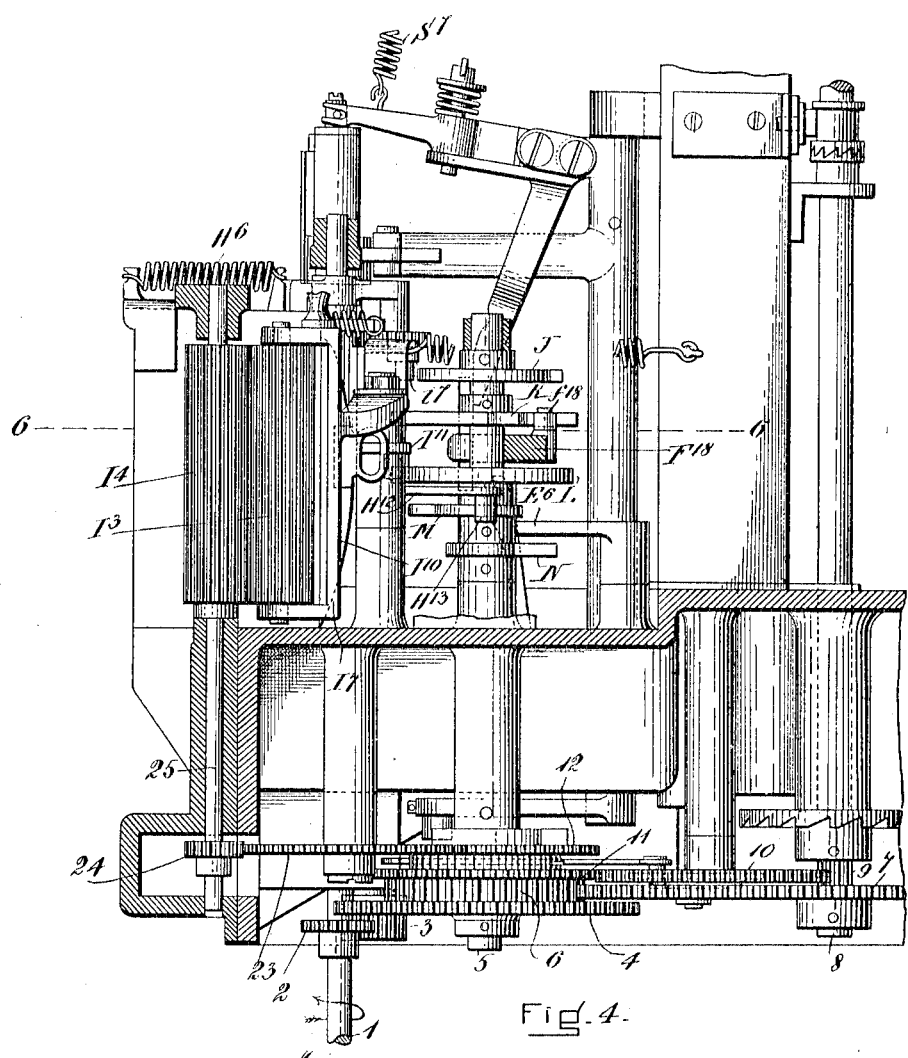
Figure 5:
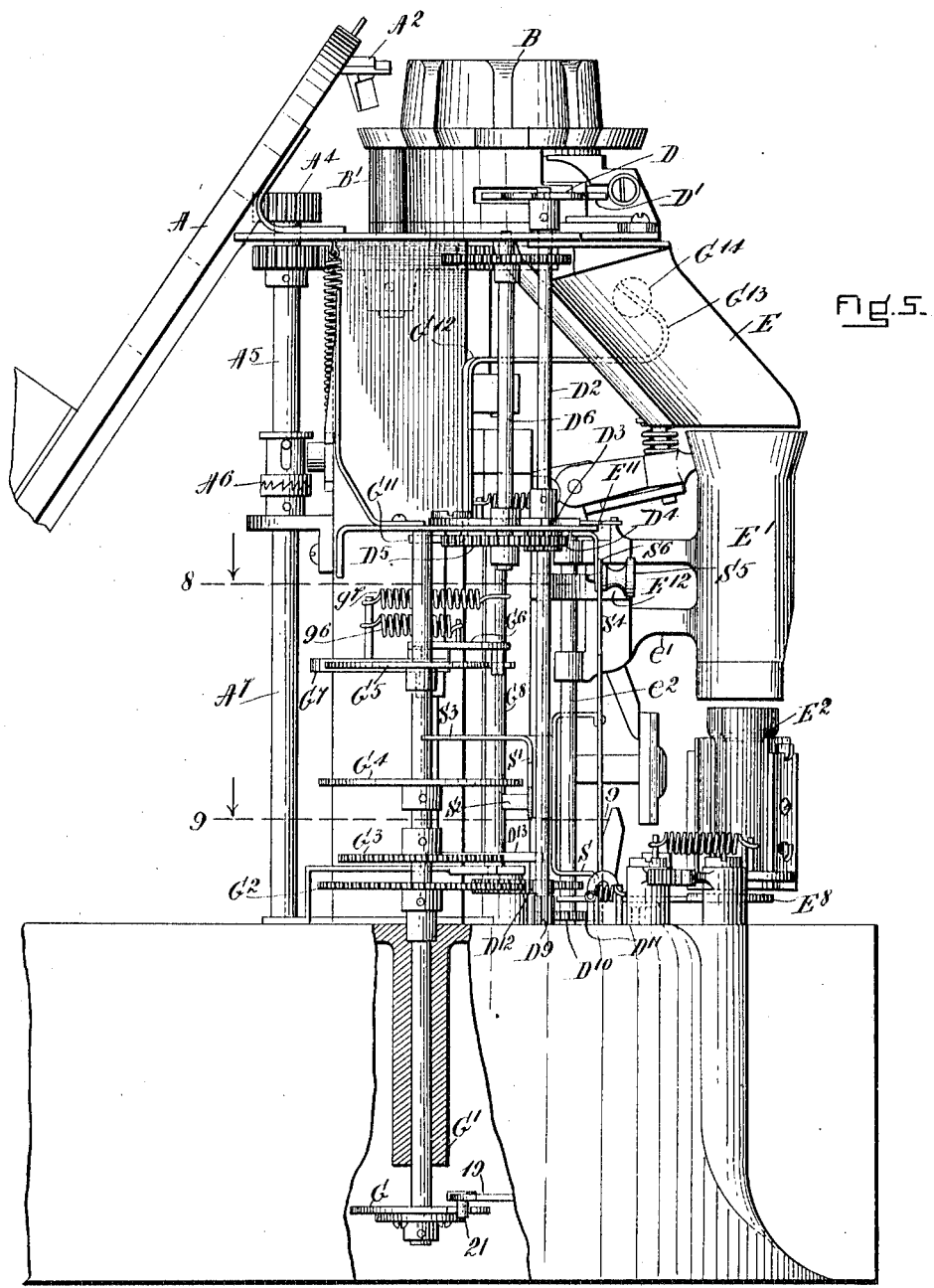
Figure 6:
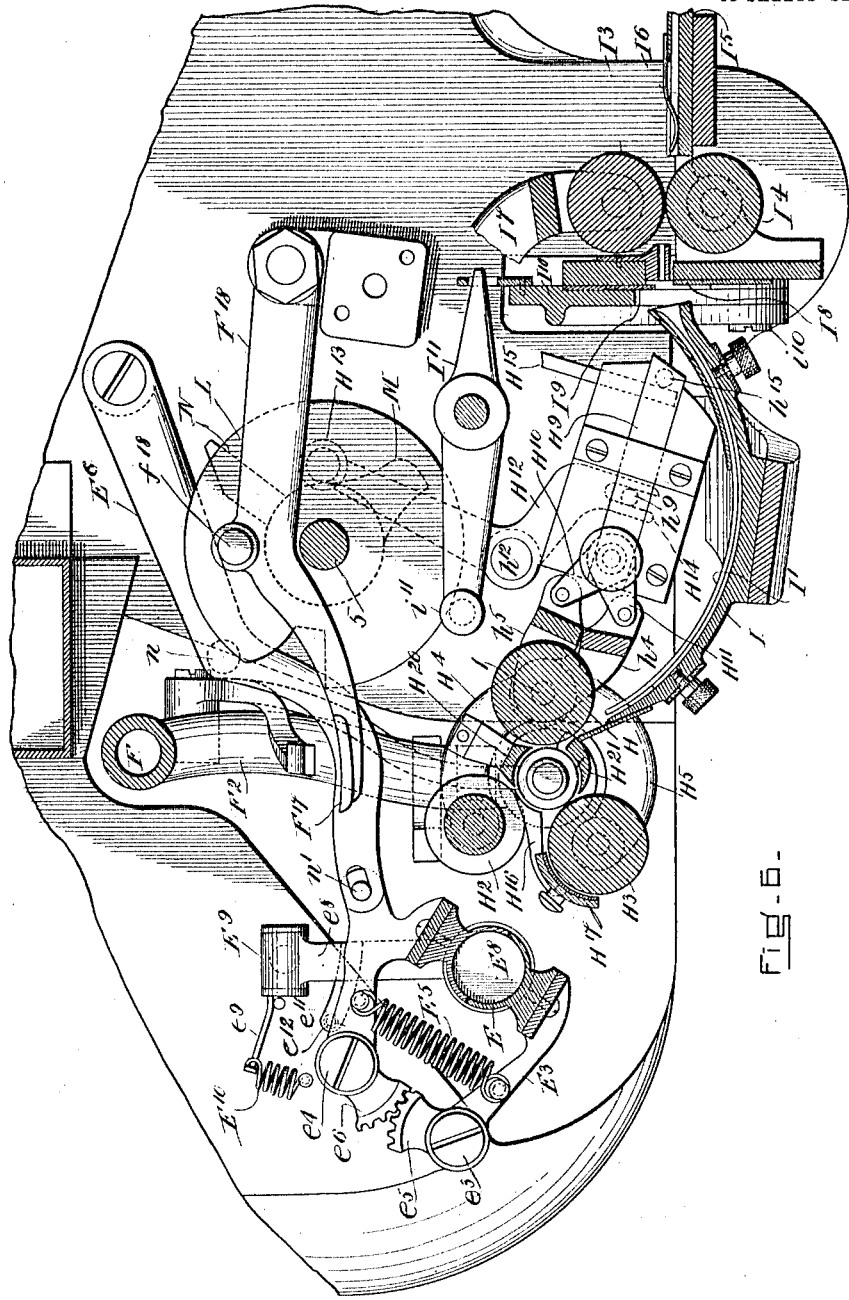
Figure 7:
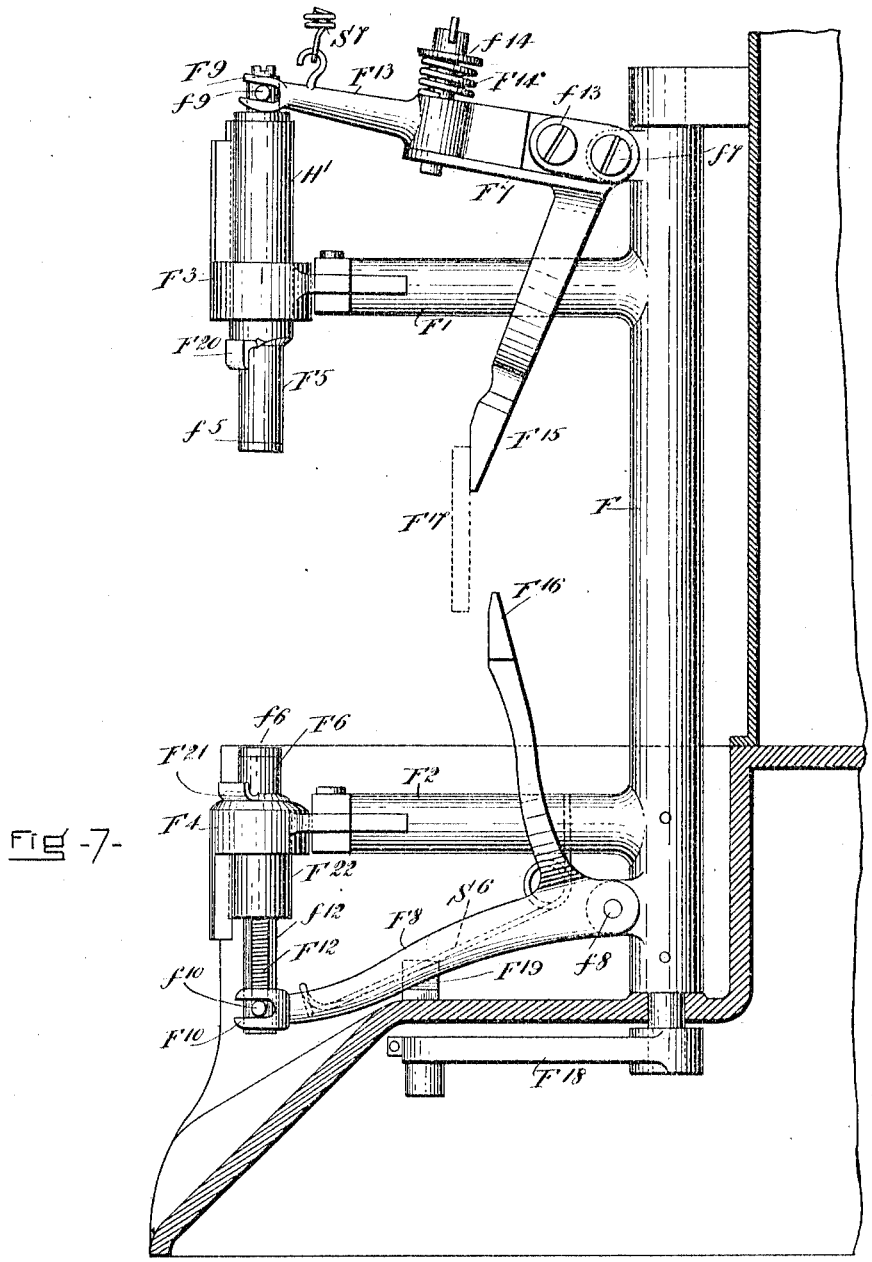
Figure 8:
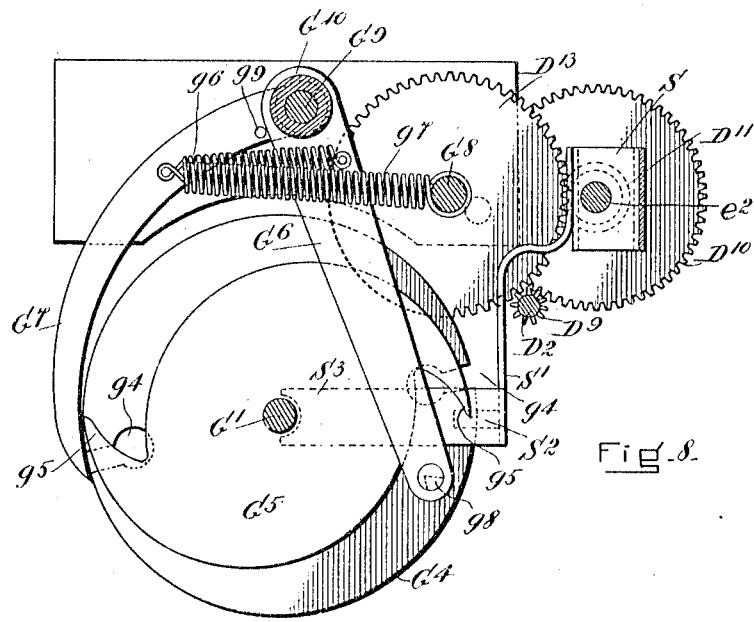
Figure 9:
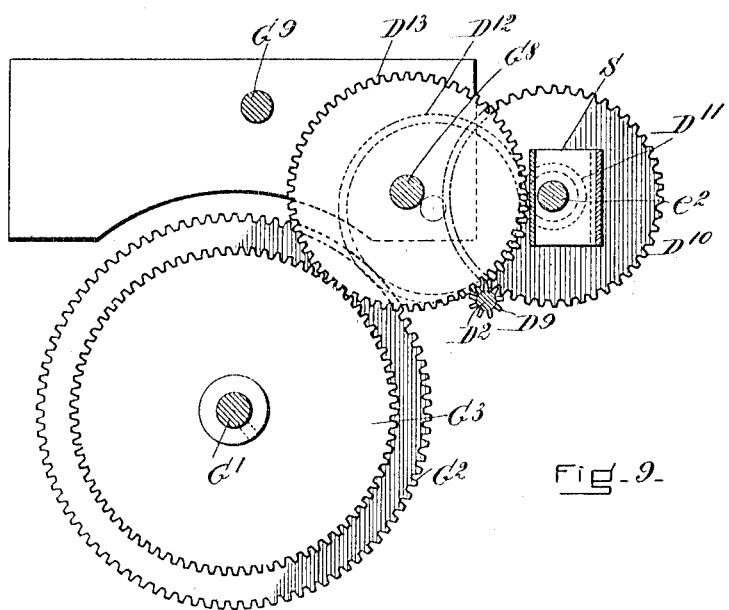
Figure 10:
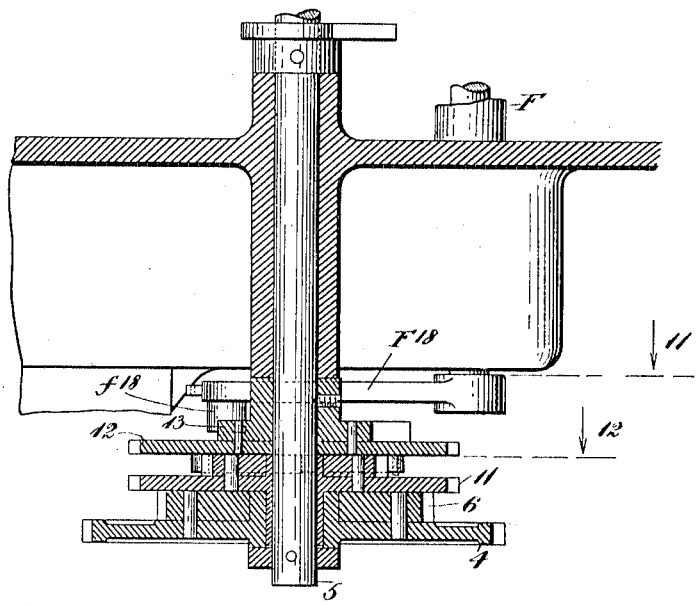
Figure 11:
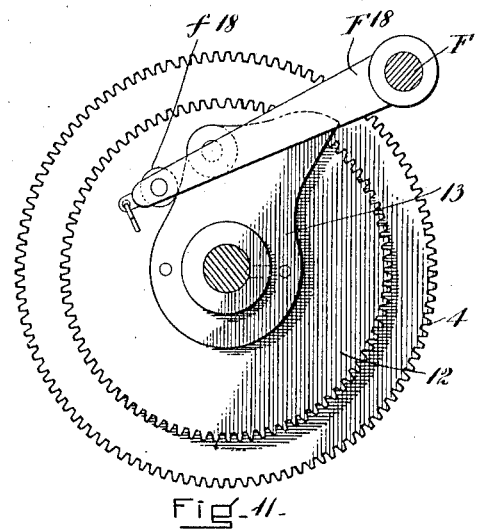
Figure 12:
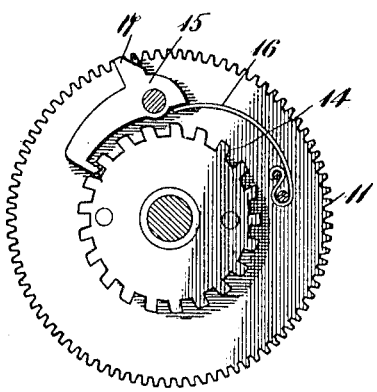
Figure 19:
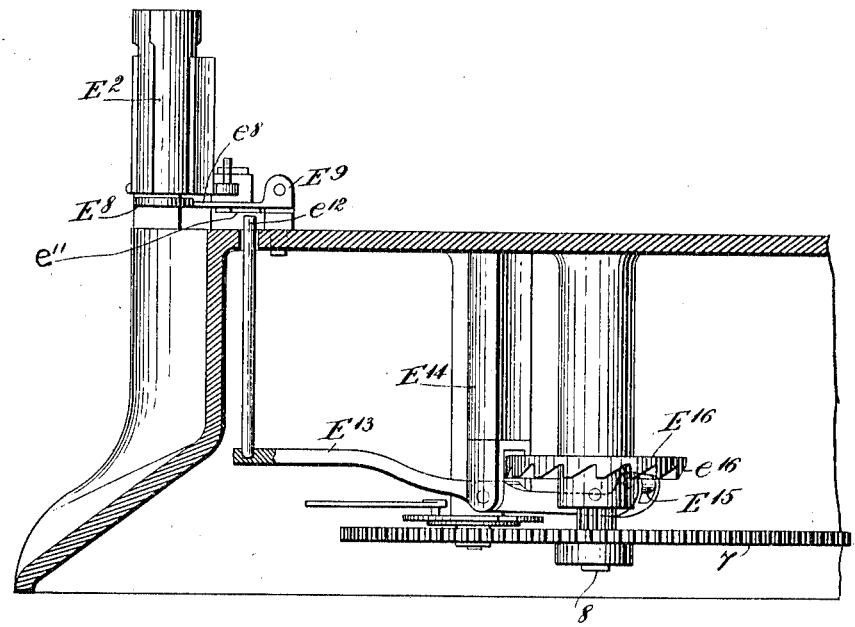

Figure 1 is a front elevation of the machine; Fig. 2 is a horizontal section viewed from above taken through the line 2—2 of Fig. 1, the portion below said line being shown in plan; Fig. 3 is a bottom plan view showing portions of the gearing in the base of the machine; Fig. 4 is a vertical section taken on line 4—4 of Fig. 2 and viewed in the direction of the arrow. In this figure the cam shaft supporting bracket is broken away to afford a view of the cams on the shaft. Fig. 5 is an elevation of the left side of the machine, part of the base being broken away to show the extension of the escapement shaft into the base of the machine; Fig. 6 is a horizontal section viewed from above and taken on line 6—6 of Fig. 4. In this view also the cam shaft bracket is not shown. Fig. 7 is a view in elevation showing in detail the crimper carrier and its frame with the crimping jaws in open position. This view is taken from the right hand side of the machine. Fig. 8 is a detail taken in horizontal section on line 8 of Fig. 5, showing the escapement plate in plan; Fig. 9 is a detail in horizontal section taken on line 9 of Fig. 5 showing in plan the change gears; Fig. 10 is a detail taken in vertical section on line 10 of Fig. 3 looking in the direction of the arrow; this view shows the arrangement of the control gears mounted on the lower end of the cam shaft; Fig. 11 is a detail in horizontal section on line 11 of Fig. 10 looking in the direction of the arrow and showing the cam and arm by which the crimper carrying frame is actuated; Fig. 12 is a detail in horizontal section on line 12 of Fig. 10 looking in the direction of the arrow, and shows the pawl and its mode of engagement with the gear wheel to drive the crimper operating arm shown in Fig. 11; Fig. 13 is a detail, partly in vertical section, showing the upper crimping jaw and its relation to its carrier frame; Fig. 14 is a detail, partly in vertical section, showing the crimper and its carrier in section and the coin holding plunger in elevation; Fig. 15 is a detail showing in vertical section the crimper carrying arm, crimper, and coin holding plunger; Fig. 16 is a section taken on line 16 of Fig. 15; Fig. 17 is a detail in section on line 17 of Fig. 15; Fig. 18 is a detail in section on line 18 of Fig. 15; and Fig. 19 is a detail, taken in section on the line 19—19 of Fig. 3, viewed in the direction indicated by the arrows, and shows the mechanism for shaking coins while the stack is being formed. [In Figs. 6 to 18, inclusive, the scale is larger than in Figs. 1 to 5, inclusive.]

The machine shown in the drawings comprises several mechanical departments which, while coördinated for the purposes implied by the general functions of the machine, may conveniently, for purposes of description, be treated separately.

*Coin collecting mechanism.*—As intimated above, a coin selecting mechanism in itself forms no part of our invention and may, indeed, be dispensed with, provided the coins which are fed to the other departments of the machine be all of one denomination. We have shown, however, a coin selecting mechanism which, as indicated above, is generally similar to that shown in the said Lilleberg patent, and which comprises a housing A in which a circular plate A' is mounted to revolve, and flaps $A^2$ which serve to deliver selected coins in succession to the transfer mechanism to be carried on their way to the counting, stacking and wrapping mechanism. The disk A' is driven by means of a bevel gear $A^3$ which meshes with a pinion $A^4$ (Fig. 5) which is actuated from the gearing of the machine in a manner hereafter to be described.

*Coin transferring mechanism.*—This mechanism which serves to transfer the selected coins delivered by the selector mechanism to the chute or channel through which they are to pass on their way to the stacking and wrapping mechanism, comprises a turret B which is revolubly mounted in a housing B'. In its lower portion which rotates within the housing the turret is provided with projections $B^2$ which are circumferentially spaced so as to provide temporary lodgment for coins which fall between the lower portion of the turret and the wall provided by the housing B'. The projections $B^2$ are, moreover, arranged in pairs between which the groove $B^3$ is formed. Through connections with the gearing of the machine the turret B is given a left-handed rotation as viewed from above, so that it carries coins, by means of the projections $B^2$, from the point where they are delivered by the flaps $A^2$ to the upper open end of the coin chute E into and through which the coins fall. At a station intermediate between the point where the coins are delivered to the turret B and the point where they leave the turret to enter the chute E, there is located the actuating wheel of the counting mechanism, so that each coin in its movement of transfer from the selector to the chute E must engage with this counter wheel, and impart a movement of rotation to it.

*Coin counting mechanism.*—A counting wheel D, provided with radial fingers D', is secured to the vertical shaft $D^2$ in such position that the fingers D' enter the groove $B^3$ in the transferring turret B. Obviously, the rotation of the turret B will have no effect upon the counter wheel D unless there is a coin confined between adjacent pairs of projections $B^2$, which, bridging the groove $B^3$, will engage a finger D' of the counter wheel D and turn the latter. The shaft $D^2$ extends downward and carries at or about its middle portion a star wheel $D^3$ and below the star wheel a pinion $D^4$ which meshes with the gear $D^5$ mounted on the shaft $D^6$ which is parallel to the shaft $D^2$; gear $D^7$ on the shaft $D^6$ meshes with gearing on and drives the counter mechanism shown and designated collectively at $D^8$ (Fig. 1). This counter mechanism need not be further described because it may be of any acceptable type. The function of the star wheel $D^3$ is to coöperate with the spring controlled retaining finger $D^{19}$ so as to guard against accidental overthrow of the counting wheel D which, as above described, is actuated by the passage of coins carried by the transfer mechanism.

*Coin stacking mechanism.*—The chute E is placed to receive coins as they drop from the transferring turret B and to deliver them to the vertical tube E' through which the coins fall, to be received in the separable section coin box $E^2$. The coin box $E^2$ comprises two half tubes each mounted on a jaw member, either $E^3$ or $E^4$; these jaw members are pivoted respectively at $e^3$ and $e^4$ and act together by means of the meshed gear sectors $e^5$ and $e^6$. These jaws are normally held in closed position by the spring $E^5$ and are opened at the proper time through the agency of the cam operated lever $E^6$ which is pivoted on the stud $E^7$ and periodically receives movement from an appropriate cam on the cam shaft, hereinafter to be described. The otherwise open bottom of the split coin box $E^2$ is covered by a stop $E^8$ which is mounted upon an arm $e^8$ which is horizontally pivoted in a vertically pivoted block $E^9$, the said block being held in normal position by means of the spring $E^{10}$ secured to the arm $e^9$ extending from the pivoted block $E^9$. The tube E' is mounted upon a bracket $e'$ which turns upon the vertical shaft $e^2$ and is normally held in the position shown in Figs. 1 and 5 by means of the spring $E^{11}$ and the stop $E^{12}$ secured to the bracket at $e'$ and normally bearing against the shaft $D^2$ (Fig. 5).

In Figs. 3 and 19 a mechanism for shaking the coins in the split coin box while the stack is being formed therein, so as to prevent a coin from standing on edge in the box, is shown. The arm $e^8$ has a lateral projection $e^{11}$, against which a rod $e^{12}$, passing through an aperture in the base of the machine, is caused to knock by the action of the lever $E^{13}$, on which the rod $e^{12}$ rests, pivoted to a hanger $E^{14}$ and provided with a roller $E^{15}$ which bears against the disk $E^{16}$ fast on the shaft 8. This disk has teeth $e^{16}$ which impart rocking movement to the lever $E^{13}$, cause the rod $e^{12}$ to knock against the projection $e^{11}$ of the arm $e^8$ and thus to agitate the bottom piece $E^8$, preventing a coin from retaining—if it has assumed—an upright position in the stack box E². Thus, as coins pass through the chute E and the tube E' they are received by the split coin box E² where, resting on the bottom plate E⁸ they accumulate in a stack inside the split box until, at a time determined by the number of coins which have been counted by the counting mechanism and delivered into the stack box E², the feed of coins to the box is temporarily interrupted to allow the coin stack transferring mechanism to remove the stack of coins from the split box E² and transfer the stack of coins to the wrapping and packaging department of the machine.

*Stack transferring mechanism.*— This mechanism comprises a pair of gripping fingers which first move to position respectively above and below the split box E² moving the vertical tube E' and the bottom piece E⁸ out of the way for the purpose, and descend and rise respectively, like a finger and thumb, gripping the stack of coins in the split box between them. Thereupon, the halves which compose the said box open to permit lateral removal of the stack of coins under the control of the gripping fingers which carry the stack into place between the rolls of the wrapping mechanism. The principal parts of this stack transferring mechanism are shown in Fig. 7. A carrying bracket F is pivotally supported in the frame of the machine and provided with horizontal arms F' and F² on the ends of which are mounted the guide blocks F³, F⁴. These guide blocks carry the tubular crimper cylinders H' and F²² in which the gripping plungers F⁵ and F⁶ are mounted to slide vertically. At their ends these plungers are provided with rotatably mounted shoes $f^5$ and $f^6$. Bell crank levers F⁷ and F⁸ are pivoted at $f^7$ and $f^8$ respectively on the bracket F, engage by means of their end forks F⁹ and F¹⁰ with pins $f^9$, $f^{10}$, which pass through slots F¹¹, F¹², and bear upon the springs $f^{11}$, $f^{12}$, which are housed in the plungers F⁵ and F⁶ which are bored out for the purpose. The upper bell crank lever F⁷ is a compound lever which comprises the arm F¹³ pivoted at $f^{13}$ on the elbow or bell crank portion F⁷ against which it is held yieldingly by the spring F¹⁴ and the pin $f^{14}$ which is fixed in the end of the lever F⁷. The shoes F¹⁵, F¹⁶, are so placed as to be operated upon in succession by the broad end of the cam actuated lever F¹⁷ shown in dotted lines in Fig. 7 and in full lines in Fig. 6. The swinging movement of the bracket F is determined by the mechanisms which operate upon the crank arm F¹⁸ which is secured to the extension of the bracket F in the base of the machine. This crank arm in its relation to the gearing in the base of the machine is shown in Fig. 3 and in detail in Fig. 11. The movements of the coin stack gripping and transferring devices pointed out hereinabove, (referring to the view of the machine shown in Fig. 1), are first: an oscillation of the bracket F to the left accompanied by a preliminary elevation of the arm F⁸ and plunger F⁶ by the operation of the fixed cam surface F¹⁹, collision between the guide block F³ and tube E' and between the plunger F⁶ with the bottom plate E⁸, resulting in lateral displacement of the tube E' and bottom piece E⁸ from their normal positions in relation to the split box E²; second: halt of the left hand oscillating movement of the carrier F with the gripping plungers F⁵, F⁶, alined above and below the split box E²; third: closure of the levers F⁷, F⁸ under the control of the cam operated lever F¹⁷ and consequent descent and elevation of the gripping plungers F⁵ and F⁶; fourth: right hand oscillation of the carrier bracket F (the split box E² having opened to allow lateral passage of the coin stack and the stack gripping plungers) to carry the stack of coins into relation with the group of rollers which subsequently move to engage the stack of coins between them and to wrap the stack with paper taken from a strip as shall hereinafter be described. For a fuller understanding of the mechanical causes of this lateral movement of the carrier bracket, reference will be had to those figures of the drawings which show the driving mechanism and gear trains located in the base of the machine.

*Driving mechanism and gearing.*—Referring to Fig. 3: the main drive shaft which derives movement from any suitable source of power, such as an electric motor, is marked 1, and it carries fast upon it a pinion 2. This pinion meshes with an idler pinion 3 which drives the gear 4 which turns on the cam shaft 5. Gear 6 is secured to the gear 4 which meshes with the large gear 7 secured to the shaft 8 through which the coin selecting mechanism is actuated through shaft A⁷, clutch A⁶ and shaft A⁵ to pinion A⁴ (Fig. 5). A pinion 9 on shaft 8 meshes with the idler gear 10 which drives the gear 11 sleeved to turn upon the shaft 8. Adjacent to gear 11 the gear 12 with its cam extension 13 is fast to the cam shaft 5. The gear 11 has mounted on it the ratchet wheel 14, while the gear 12 carries the pawl 15, the engaging end of which is normally urged toward the ratchet wheel 14 by means of the spring 16. At the back of the pawl 15 there is a thumb or projection 17 which is adapted to engage with the catch 18 on the end of the beam 19 pivoted in the frame and provided at its other end with a stud 21 adapted to enter the notches $g$ in the plate G fixed to the lower end of the vertical shaft G' (see Figs. 3 and 5). Assuming that by the rotation of the disk G the stud 21 has been made to ride upon the periphery of the disk, the catch 18 at the opposite end of the beam 19 will be moved inward where it will engage with the projection 17 on the pawl 15. Assuming that this pawl 15 is in engagement with the ratchet 14 and is therefore turning with the ratchet and the gear 11, it will presently arrive at the point where the projection 17 will be detained by the notch 18 in the beam 19 and the pawl 15 will be turned out of engagement with the ratchet wheel 14. Now, assuming that in further rotation of the plate G, a notch $g$ comes opposite to the stud 21, the spring 22 will rock the beam 19 and release the projection 17 from the hook 18 allowing the spring 16 (Fig. 12) to cause the pawl 15 and ratchet wheel 14 to engage. This engagement will cause the two gears 11 and 12 to rotate in unison. The gear 12 carries upon its upper side the cam 13 (Fig. 11) which in rotating operates upon the follower $f^{18}$ to turn the crank arm $F^{18}$ and consequently to oscillate the bracket F to accomplish the lateral swinging movements hereinabove described. At the same time the bracket F is thus oscillated the cam shaft 5 (see Figs. 3, 4 and 10) will be rotated since the gear wheel 12 is fast to it and all movements of the machine which are consequent upon the rotation of this cam shaft, will follow during the period when the two gears 11 and 12 rotate in unison by the engagement of the pawl 15 with the ratchet 14 as above described. The mechanism by which the periodic recurrence of the oscillating movement of the coin stack transferring bracket is determined, is shown in Figs. 5, 8 and 9 and constitutes the tripping and coin stop mechanism.

*Tripping and coin stop mechanism.*— This department of the machine is shown in its relation to other departments in Fig. 5 and in detail in Figs. 8 and 9. Referring to Fig. 5: The shaft G' extends upward from the base of the machine and has fixed upon it the gears $G^2$, $G^3$, the disk $G^4$ and the escapement plate $G^5$. This shaft G' is rotated by gear connections with the shaft $D^2$ at the upper end of which the counter wheel D is mounted. These gear connections comprise the pinion $D^9$ at the lower end of the shaft $D^2$, the change gears $D^{10}$, $D^{11}$, which are rigidly secured together and mounted to slide up and down upon the post $e^2$. Intermediate gears $D^{12}$, $D^{13}$ mesh respectively with the gears $G^2$, $G^3$. According to the vertical position of the gears $D^{10}$, $D^{11}$, the gear $D^{11}$ meshes with either gear $D^{12}$ or $D^{13}$. These change gears $D^{10}$, $D^{11}$, are shifted by means of the shipper S which comprises a plate S' and a horizontal arm $S^3$ which is forked at its end to embrace partly the shaft G' which thus serves as a guide for the shipper S. A stud $S^2$ projects laterally from the plate S and lies either above or below the disk $G^4$ through which it can pass only when one of the notches $g^4$ (see Fig. 8) comes into register with the said stud $S^2$ in the course of the rotation of the disk $G^4$. When a notch $g^4$ is in register with the stud $S^2$ the retaining pin $S^5$ (Fig. 5) mounted on the end of the spring arm $S^4$ can be moved out of a hole in the fixed plate $S^6$, the shipper S then moved either upward or downward as the case may be and the pin $S^5$ fixed in another hole in the plate $S^6$. This movement will carry with it the change gears $D^{10}$, $D^{11}$ and thus the gear $D^{11}$ can be made to mesh with either the gear $D^{12}$ or $D^{13}$. With the gears arranged as shown in Fig. 5, a train consists of $D^9$, $D^{10}$, $D^{11}$, $D^{12}$, $G^2$. The counter wheel D at the top of shaft $D^2$ has five projecting fingers D' so that in order to impart a full rotation to this counter wheel, five coins must pass the counter wheel under the control of the transfer turret B. Then if the gear ratio in the above mentioned train is such that the shaft $D^2$ makes twenty full rotations while the shaft G' makes a single full rotation, it is obvious that that single full rotation of the shaft G' is the result of the passage of one hundred coins past the counter wheel D.

Mechanism associated with the shaft G' and the escapement disk $G^5$ carried on the said shaft determines the recurrent temporary interruption of the passage of coins through the inclined chute E, while at corresponding intervals the rotation of the disk G mounted at the lower end of the shaft G' determines the engagement of the gear members which in turn control the operation of the coin transferring mechanism and other departments of the machine which depend upon the rotation of the cam shaft and its cams, hereinafter to be described. The escapement plate $G^5$ is provided with two teeth $g^5$ diametrically opposite each other, between which the edge of the plate $G^5$ descends toward the center with progressively diminishing radius so as to form surfaces similar to those of a cam. Upon the post $G^9$ there are pivotally supported two spring controlled arms $G^6$ and $G^7$. The arm $G^6$ carries at its outer extremity a pin $g^8$ which lies in the path of the rotating periphery of the plate $G^5$, while the arm $G^7$ lies in the same plane as the plate $G^5$. These two arms are secured together by the spring $g^6$ which constantly exerts tension and thus tends to draw the two arms $G^6$, $G^7$ toward each other. A spring $g^7$ secured at one end to the post $G^8$ and at the other end to the arm $G^7$ is under tension and tends to draw the two arms $G^6$ and $G^7$ both together toward the post $G^8$ when in the movement of arm $G^7$ the pin $g^9$ strikes the arm $G^6$. The arm $G^6$ has rigidly secured to it the sleeve $G^{10}$ and the said sleeve carries at its upper end the radial arm $G^{11}$ which extends upward and is then bent at right angles at $G^{12}$ and terminates in the curved stop $G^{13}$ which normally stands opposite a hole $G^{14}$ in the side of the chute E. Oscillation or partial rotation of the sleeve $G^{10}$ carries with it the arm $G^{11}$ and inserts or withdraws the stop $G^{13}$ through the hole $G^{14}$. When, therefore, the shaft $G'$ has rotated (left handed as viewed in Fig. 8) until the pin $g^8$ is drawn inward toward the shaft $G'$ over the point of a tooth $g^5$, by means of the spring $g^6$, the rotative movement of the sleeve $G^{10}$ causes the stop $G^{13}$ to enter the hole $G^{14}$ and serve temporarily as an obstruction past which coins entering the chute E may not descend. Further rotation of the shaft $G'$ out from under the arm $G^7$ and the spring $g^7$ then causes the arm $G^7$ to move inward relieving the tension on the spring $g^6$ and forcing the arm $G^6$ to move outward again by means of the pin $g^9$ on the arm $G^7$ which then comes in contact with the arm $G^6$ to carry it and the sleeve to which it is attached under the tension of the spring $g^7$. This movement removes the stop $G^{13}$ from the chute E and allows such coins as have accumulated in the upper end of the chute to fall through it into the tube $E'$ and split coin box $E^2$. It is in this interval when the coins are momentarily stopped in the chute E that the carrier F is moved to the left as described hereinabove to seize the stack of coins accumulated in the split coin box $E^2$ and remove them laterally from the box. Almost contemporaneously with the stoppage of the coin feed through the chute E, one of the notches $g$ in the disk G (Figs. 3 and 5) arrives opposite the stud 21 on the arm 19 allowing the spring 22 to move that end of the arm which carries the hook 18, outward releasing the pawl 15 (see Fig. 12) which by engaging the ratchet wheel 14 places the cam shaft to which the gear 12 is fast, into driven connection with the gear train shown in Figs. 3 and 4 hereinabove described. A notch $g$ allows the stud 21 to fall into it just after the stoppage of the coin feed chute E, above described. After the arm $G^6$ has passed the point of a tooth $g^5$, the disk G requires to be turned a little farther to make a notch $g$ reach the stop 21 to allow it to fall; this movement is imparted to the disk G by the passage of one coin past the counter wheel D. The operation of the coin stop actuator and the starting of the stack transferring mechanism in succession, by the action of two coins in succession on the counting mechanism makes certain the deposit of the exact predetermined number of coins in the stack before the stack is removed from the split coin box.

*Coin stack wrapping and crimping mechanism.*—The coin stack transferring devices of which the principal parts are shown in Fig. 7 and which has been described hereinabove, takes a stack of coins from the split box $E^2$ Figs. 1 and 2) and carries the stack horizontally to a group of three wrapping rollers which close upon the stack, bringing the coins into correct vertical alinement, and wind a previously prepared strip of paper around the stack. When the paper cylinder has been formed by the wrapping operation, the crimping devices carried by the swinging bracket F (Fig. 7) close against the ends of the paper cylinder and crimp it at top and bottom tightly against the ends of the coin stack. The group of winding rollers is shown in Figs. 1 and 2. The driving roller H is keyed to the driving shaft 1 and carries at its upper end a gear $h$. The second and third driving rolls, $H^2$, $H^3$, are mounted on the arms of a scissor frame $H^4$, $H^5$ which are pivoted on the shaft 1 and extend to the other side of the shaft to form the arms $h^4$, $h^5$, which are joined by the tension spring $H^6$. The roll $H^2$ carries at its head the gear $h^2$ and the roll $H^3$ the gear $h^3$. Intermediate gears $H^7$, $H^8$ are journaled respectively to the scissor arms $H^4$, $H^5$, both meshing with the gear $h$ and gear $H^7$ meshes with gear $h^2$, while gear $H^8$ meshes with gear $h^3$. These trains of gearing cause the three wrapping rollers H, $H^2$, $H^3$ to rotate continuously and at equal surface speeds under the impulse of the driving shaft 1. The opening and closing of the scissor frame which carries these rollers is controlled by the slide $H^9$ (Fig. 2) which carries the links $H^{10}$, $H^{11}$, these being pivoted to the arms $h^5$, $h^4$, of the scissor frame. The reciprocating movements of the slide $H^9$ are determined by the cam operated bell crank lever $H^{12}$ (Fig. 6) pivoted at $h^{12}$ to the frame of the machine and provided with a cam follower $H^{13}$ at one end and with a fork $H^{14}$ at the other which embraces a pin $h^9$ on the lower side of the slide $H^9$. Under the control of a cam hereinafter to be described, the cam lever $H^{12}$ moves the slide $H^9$ toward the roller H opening the scissor frame by the action of the links $H^{10}$ $H^{11}$. To close the scissor frame and bring the three rollers H, $H^2$, $H^3$ into contact with a stack of coins carried by the mechanism of the bracket F, the reverse movement of the slide $H^9$ is effected by means of the leaf spring $H^{15}$ which bears against the pin $h^{15}$ on the end of the slide $H^9$; this movement is assisted by the spring $H^6$ which exerts tension between the arms $h^5$, $h^4$ of the scissor frame. The timing of these opening and closing movements is determined by the rotation of the cam shaft to be described, and is so coördinated with the movements of the other parts of the machine that the scissor frame opens and remains open until a stack of coins is transferred to it by the coin stack transferring mechanism, when it closes and remains closed while the wrapping rollers wind a paper strip around the coin stack and the crimping devices crimp the ends of the wrapped paper upon the coin stack after which the scissor frame is opened to release the wrapped stack of coins allowing it to fall out of the machine into some suitable receptacle provided for the purpose. The details of the scissor frame actuating mechanism are shown in Fig. 6. A paper guide $H^{16}$ (see Fig. 6) is provided to insure conveyance of the paper strip from roll $H^2$ to roll $H^3$. This guide is carried upon a segmental plate $H^{17}$ which is pivoted to turn concentrically with the axis of the roller $H^3$. At the top of the plate $H^{17}$ there is forked a shipper plate $H^{18}$ (Fig. 2) which engages with the slide block $F^3$ which is mounted on the coin stack transferring mechanism and is shown in detail in Fig. 7. When this transferring mechanism swings from the position shown in Fig. 2 toward the split coin box $E^2$, it strikes against the finger $h^{18}$ of the shipper $H^{18}$ rotating the latter and with it the segment plate $H^{17}$ and the paper guide $H^{16}$ so that the paper guide $H^{16}$ is swung out of the way to permit the transfer of the stack of coins from the split coin box $E^2$ to the group of rollers in the reverse movement of the transferring bracket F. In its return, that is to say, its movement toward the wrapping rollers, the guide block $F^3$ strikes against the finger $h^{17}$ of the forked shipper plate $H^{18}$ and throws the plate and the paper guide $H^{16}$ into the position shown in Fig. 6. Stationary paper guides $H^{20}$, $H^{21}$ (Fig. 6) serve to keep the paper strip under control in passing from the roller H to roller $H^2$ and from roller $H^3$ to roller H. The paper strip preparing mechanism hereinbelow to be described provides a strip of paper of proper length and width which lies between the front and back plates I, I' (Fig. 6) with its forward end lying lightly against the rotating surface of the roller H.

When the coin stack transferring mechanism carries a stack of coins into the embrace of the wrapping rollers, and the rollers $H^2$ $H^3$ close upon the coins, alining them and pressing them against the roller H, the paper strip is nipped between the coin stack and the roller H and carried around, the strip being guided by the paper guides $H^{20}$, $H^{16}$, $H^{21}$ in turn and drawing the previously prepared strip out from between the plates I, I' to be wrapped around the coin stack. The action of the rollers H, $H^2$ and $H^3$ winds the paper strip around the coin stack and holds it closely against the coins, while the crimping mechanism closes upon the ends of the paper cylinder thus formed and crimps them over the coins. This crimping mechanism is shown in detail in Figs. 7, 13, 14, 15, 16 and 17, to which reference is now made. The stack of coins being held between the rotatable shoes $f^5$, $f^6$, the end $F^{17}$ of the crimper actuating lever $F^{18}$ (Fig. 6) moves against the lever arms $F^{15}$, $F^{16}$ under the control of the cam on the cam shaft (to be described) after the stack transferring bracket F has swung the coins into position between the wrapping rollers. The fork $F^9$ descends until it bears upon the top of the crimper cylinder H', while the lower fork $F^{10}$ ascends until it bears upon the lower end of the corresponding crimper cylinder $F^{22}$ and the crimper fingers $F^{20}$ and $F^{21}$ (Fig. 7) carried respectively by the cylinders H', $F^{22}$ close upon the paper previously wrapped around the coin stack and crimp it upon the coins. A spring $F^{19}$ (Figs. 14 and 15) yields to permit this movement of the cylinder H' over the plunger $F^5$ and when the lever arms $F^7$, $F^8$, rise and fall respectively under the stress of springs $S^7$, $S^6$, (Fig. 7) restores the cylinder H' and plunger $F^5$ to their normal relative positions. A similar spring connection between the cylinder $F^{22}$ and plunger $F^6$ (not shown in detail) performs the same office for the lower coin holding and crimping members. The cylinder H' slides in the guide block $F^3$ and the cylinder $F^{22}$ slides in a similar manner in the guide block $F^4$.

*Paper strip preparing mechanism.*—A paper feed roll $I^4$ (Figs. 1, 2 and 6) is secured to the vertical shaft 25 (Fig. 3) which carries pinion 24 which meshes with gear 23 which in turn meshes with gear 12 (Figs. 4 and 10) which, as above described, is fast to the cam shaft 5 and is rotated intermittently when engaged with gear 11 by means of the pawl 15 (Fig. 12). Therefore, at stated periods in the operation of the machine, roller $I^4$ is rotated. The roller $I^3$ is journaled in the end of the cam controlled lever $I^7$ and periodically swings in and out toward the roller $I^4$ to engage a strip of paper conducted through the channel $I^5$ under the detaining spring $I^6$ (Fig. 6), this strip coming from a supply roll or other convenient source. When by the operation of its controlling cam the lever $I^7$ moves the roll $I^3$ against the roller $I^4$, (this being at a time in the operation of the machine when the roller $I^4$ is to be rotated) the strip of paper will be drawn from the guide $I^5$, propelled past the shearing plate $I^8$ and inserted between the guide plates I and I', progressing forward toward the wrapping rollers until in the cycle of operation of the machine the roller $I^4$ ceases to rotate, the roller $I^3$ is withdrawn from contact with the roller $I^4$ and the paper strip is cut off by the knife $I^9$ carried on knife bar $I^{10}$ which is pivoted at $i^{10}$. This knife bar $I^{10}$ is under the control of the cam operated lever $I^{11}$ which when released by its cam allows the spring $I^{12}$ to snap the knife bar and its knife outward to sever a length of paper from the strip. This severed length is left between the plates I, I', its forward end having been projected until it lies lightly against the wrapping roller H to be nipped between the said roller and a stack of coins as hereinabove described.

*Control mechanism, consisting of the cam shaft and its operating cams.*—Several of the hereinabove described departments of the machine are periodically operated by means of the cams secured to the vertical cam shaft 5. This cam shaft is brought into operation through the connections of the gear 12 with the gear 11 in the manner described hereinabove and illustrated in Figs. 10 and 12. While the coin stack transferring bracket F is being swung first to the left, as viewed in Fig. 1, and then to the right to its position in the group of wrapping rollers where it pauses, namely, while the gear 12 and with it the cam 13 makes a full rotation, the cam shaft 5 secured to the gear 12 also makes a full rotation, opening in succession by means of its cams, the closure of the coin stack gripping plungers $F^5$, $F^6$, the closure of the scissors frame which carries the wrapping roller, the closure of the crimpers upon the ends of the wrapped paper cylinder, the engagement of paper feeding rollers $I^3$, $I^4$, the opening of the crimpers, the release of the paper roll carrying scissors frame to be opened by its springs, the releasing movement of the paper feeding roller $I^3$, the retraction and release of the paper cutting knife, all of which have been described in detail hereinabove.

Referring to Fig. 4, the operating cams are lettered from top to bottom, J, K, L, M and N. The uppermost cam J operates on the follower stud $i^7$ to move the lever $I^7$ which carries the paper feeding roller $I^3$ inward and outward. The cam K operates on the follower stud $f^{18}$ on the lever $F^{18}$ which carries at its outer end the shoe $F^{17}$ by means of which the gripping plungers and crimpers shown in Fig. 7 are given the movements above described. The cam L operates on the follower pin $i^{11}$ of the cutter controlling lever $I^{11}$. The cam M operates on the follower pin $H^{13}$ of the lever $H^{12}$ to effect the movement of the scissors frame controlling slide $H^9$. The cam N operates on the follower pin $n$ which is secured to the lever $E^6$ which, through the pin-and-slot connection $n'$, moves the segmentally connected levers $E^3$, $E^4$, which carry the halves of the split coin box $E^2$.

The mode and principle of operation of the above described machine is as follows: Coins of a selected denomination are carried *seriatim* into contact with a number of, or connected with, coin counting mechanism, so as to actuate the counting mechanism which preferably comprises numbering devices to record the total number of coins which have actuated the counting mechanism. After being thus counted the coins proceed through a suitable channel to the devices in which they are stacked. As each stack is to contain a predetermined number of coins, and be removed to make place for a succeeding accumulation of coins, the coin stop mechanism is provided, which is actuated by and from the coin counting mechanism in such manner that, after a predetermined number of coins has operated on the counting mechanism, a barrier or stop is interposed in the path of coins on their way to the stacking devices; for instance, every hundredth coin brings the mechanism associated with the counter to the point where it trips, or actuates, the barrier or stop. This does not, however, interrupt the progress of coins to and past the counting mechanism, so that coins accumulate on the barrier until in the further progress of the machine, the barrier is removed to allow the accumulated coins to fall together into the stacking devices. During the interval while the stop is interposed in the path of the coins, the stack of coins previously accumulated in the coin box which forms part of the stacking devices is grasped by the stack transferring mechanism, and moved into the grasp of the stack wrapping mechanism. The first movement of the stack transferring mechanism is the first of a cycle of operations which is initiated through the medium of the coin counting mechanism. In order to allow time for the last coin required to complete the stack to arrive in place in the coin box, the initiation of the cycle of operations, which begins with the movement of the stack transferring mechanism to the stack of coins in the coin box, is timed to occur just after the entrance of the coin stop into the channel leading to the stacking devices. Thus, if the stop is actuated in time with the passage of every hundredth coin, the advisable delay in the initiation of the cycle of operations on the coin stack may be insured by timing the initiation of the cycle on the passage of the coin next after the hundredth coin aforesaid. As soon as a stack of coins is removed from the coin box, the latter and the parts associated with it, is restored to condition proper for the reception of the coins as before. Thereupon the stop is removed from the coin path, and the accumulation of coins to form another stack in the coin box, is resumed. The cycle of operations upon a stack of coins after its removal from the coin box takes place while a succeeding stack is in process of formation in the coin box. This cycle of operations comprises, first; transfer of a stack of coins to the group of wrapping rolls; second, action of the wrapping rolls to wind a length of paper around the coin stack; third, closure of the crimping devices on the ends of the wrapper to crimp them over the ends of the coin stack; fourth, opening and withdrawal of the crimping and stack transferring mechanism; fifth, release of the wrapped coin stack by the wrapping rolls; sixth, advance of a suitable length of paper from a roll or other supply, to a distance sufficient to lay the end of the strip lightly against one of the wrapping rolls; seventh, severance of the advanced portion of paper from the strip. This cycle of operations, once initiated, is automatically completed, and the connection with the source of power of the mechanism which controls the cycle, is automatically terminated.

We claim:

1. In a coin handling machine, the combination of coin transferring mechanism, coin counting mechanism adapted to be actuated by coins moved by the coin transferring mechanism, coin stacking devices comprising a stack receptacle made in separable normally united sections adapted to be separated to permit removal of the coins from said receptacle, coin stack wrapping devices, and stack transferring devices movable between the stack receptacle and the stack wrapping devices, provided with means to seize and carry a stack of coins from the receptacle to the wrapping devices.

2. In a machine for handling coins, the combination of coin stack wrapping mechanism, comprising a group of intergeared rolls adapted to embrace a stack of coins, coin stack transferring mechanism to deliver a stack of coins to the wrapping rolls and hold it while embraced by the rolls, means to feed a wrapper strip to the wrapping rolls, and crimping devices mounted on the stack transferring mechanism, and means to actuate said crimping devices to crimp the ends of a wrapped strip over the ends of a coin stack.

3. In a coin handling machine, the combination of coin transferring devices to deliver coins to coin stacking devices, coin counting mechanism actuated by coins in transit to the coin stacking devices, coin stacking devices, adapted to deliver a stack of coins to coin stack transferring mechanism, coin stack transferring mechanism movable between the coin stacking devices and coin wrapping mechanism, the coin wrapping mechanism adapted to receive a stack of coins in the grasp of the coin stack transferring mechanism, means to supply a wrapper strip to the coin wrapping mechanism, and controlling mechanism to determine the operation of the coin stacking devices and transferring mechanism, with means initiated by the coin counting mechanism to stop the passage of coins from the coin transferring devices to the coin stacking devices, and to impart movement intermittently to said controlling mechanism.

4. In a coin handling machine, the combination of coin transferring devices to deliver coins to coin stacking devices, coin counting mechanism actuated by coins in transit to the coin stacking devices, coin stacking devices adapted to deliver a stack of coins to coin stack transferring mechanism, coin stack transferring mechanism, movable between the coin stacking devices and coin wrapping mechanism, the coin wrapping mechanism adapted to receive a stack of coins in the grasp of the coin stack transferring mechanism, means to supply a wrapper strip to the coin wrapping mechanism, controlling mechanism to determine the operation of the coin stacking devices and coin transferring mechanism, with means initiated by the coin counting mechanism to stop the passage of coins from the coin transferring devices to the coin stacking devices, and to impart movement intermittently to said controlling mechanism, and means to interrupt the operation of the control mechanism after the latter has completed its predetermined cycle.

5. In a coin handling machine, the combination of coin transferring devices to deliver coins to coin stacking devices, coin counting mechanism actuated by coins in transit to the coin stacking devices, coin stacking devices adapted to deliver a stack of coins to coin stack transferring mechanism, a movable coin stop between the coin counting mechanism and coin stacking devices, coin stack transferring mechanism movable between the coin stacking devices and the coin wrapping mechanism, the coin wrapping mechanism adapted to receive a stack of coins in the grasp of the coin stack transferring mechanism, means to supply a wrapper strip to the coin wrapping mechanism, controlling mechanism to determine the operation of the coin stacking devices and transferring mechanism, with means initiated by the coin counting mechanism to stop the passage of coins from the coin transferring devices and the coin stacking devices, and to impart movement intermittently to said controlling mechanism, and means to remove the cam stop after the stack of coins is delivered to the stack transferring mechanism.

6. In a coin handling machine, the combination of coin transferring devices to deliver coins to coin stacking devices, coin counting mechanism actuated by coins in transit to the coin stacking devices, coin stacking devices adapted to deliver a stack of coins to coin stack transferring mechanism, coin stack transferring mechanism movable between the coin stacking devices and coin wrapping mechanism, the coin wrapping mechanism adapted to receive a stack of coins in the grasp of the coin stack transferring mechanism, means to supply a wrapper strip to the coin wrapping mechanism, controlling mechanism to determine the operation of the coin stacking devices and transferring mechanism, with means initiated by the coin counting mechanism to stop the passage of coins from the coin transferring devices to the coin stacking devices, and to impart movement intermittently to said controlling mechanism, means to interrupt the operation of the control mechanism after the latter has completed its predetermined cycle, and means to remove the coin stop after the stack of coins is delivered to the stack transferring mechanism.

7. In a machine for handling coins, the combination of coin transferring mechanism to receive coins and transfer them *seriatim*, coin stacking devices, coin counting mechanism actuated by coins in the coin transferring mechanism, means controlled by the coin counting mechanism to arrest momentarily at predetermined intervals the passage of coins from the coin transferring mechanism to the coin stacking devices, stack transferring mechanism to transfer a stack of coins from the coin stacking devices to stack wrapping mechanism, means controlled by the coin counting mechanism to actuate the stack transferring mechanism, the stack wrapping mechanism comprising rolls to embrace a stack of coins, and means to supply a wrapping strip, and wrapper crimping devices associated with the stack transferring mechanism to crimp the strip over the ends of the coin stack.

8. In a machine for handling coins, the combination of coin transferring mechanism to receive coins and transfer them *seriatim*, coin stacking devices, coin counting mechanism actuated by coins in the coin transferring mechanism, means controlled by the coin counting mechanism to arrest momentarily at predetermined intervals the passage of coins from the coin transferring mechanism to the coin stacking devices, stack transferring mechanism to transfer a stack of coins from the coin stacking devices to stack wrapping mechanism, means controlled by the coin counting mechanism to actuate the stack transferring mechanism, the stack wrapping mechanism comprising rolls to embrace a stack of coins, means to supply a wrapping strip, wrapper crimping devices associated with the stack transferring mechanism to crimp the strip over the ends of the coin stack, and means to release the wrapped stack of coins from the wrapping and stack transferring mechanism.

9. In a machine for handling coins, the combination of coin stack forming mechanism, coin stack wrapping mechanism, comprising a group of rolls adapted to embrace a stack of coins and intermittently acting driving means for said wrapper rolls, stack transferring mechanism to deliver a preformed stack of coins sidewise to the wrapping rolls, means to supply a wrapper strip to the wrapping mechanism comprising a strip guide, strip feed rolls and means to actuate them intermittently to feed forward a wrapper strip through said guide and lay its leading end in position to be nipped between a wrapping roll and a stack of coins by the delivery of the stack to the rolls, and a cutter with means to actuate the cutter timed to sever the wrapper strip before the wrapper roll actuating means operates.

10. In a machine for handling coins, the combination of coin stack forming mechanism, coin stack wrapping mechanism, comprising a group of rolls adapted to embrace a stack of coins and intermittently acting driving means for said wrapper rolls, stack transferring mechanism to deliver a preformed stack of coins sidewise to the wrapping rolls, means to supply a wrapper strip to the wrapping mechanism, comprising a strip guide, strip feed rolls, and means to actuate them intermittently to feed forward a wrapper strip through said guide and lay its leading end in position to be nipped between a wrapping roll and a stack of coins by the delivery of the stack to the rolls, and a cutter with means to actuate the cutter timed to sever the wrapper strip before the leading end of the strip is nipped and the wrapper roll actuating means operates.

11. In a machine for handling coins, the combination of coin stack forming mechanism, coin stack wrapping mechanism, transferring mechanism to transfer a preformed stack of coins from the coin stack forming mechanism sidewise to the wrapping mechanism, means timed to operate the transferring mechanism and wrapping mechanism intermittently and relatively in alternation, means to supply a wrapper strip to the wrapping mechanism, comprising a strip guide, strip feed rolls, and means to actuate them intermittently to feed forward a wrapper strip through said guide and lay its leading end adjacent to the wrapping mechanism to be nipped between said wrapping mechanism and a stack of coins by the delivery of the stack to the wrapping mechanism, and a cutter to sever a wrapping length from the end of the strip.

12. In a machine for handling coins, the combination of coin stack forming mechanism, coin stack wrapping mechanism, transferring mechanism to transfer a pre-formed stack of coins from the coin stack forming mechanism sidewise to the wrapping mechanism, driving means timed to operate the transferring mechanism and wrapping mechanism intermittently and relatively in alternation, means to supply a wrapper strip to the wrapping mechanism, comprising a strip guide, strip feed rolls, and means to actuate them intermittently to feed forward a wrapper strip through said guide and lay its leading end adjacent to the wrapping mechanism to be nipped between said wrapping mechanism and a stack of coins by the delivery of the stack to the wrapping mechanism, and a cutter to sever a wrapping length from the end of the strip, said strip feed mechanism timed to advance the strip between the operations of the wrapping mechanism.

Signed by us at Boston, Massachusetts, this eleventh day of June, 1913.

LOUIS A. CASGRAIN.
  RAYMOND L. WHITMAN.

Witnesses:
  ODIN ROBERTS,
  FLORENCE A. COLLINS.

Copies of this patent may be obtained for five cents each, by addressing the "Commissioner of Patents, Washington, D. C."